United States Patent
Sivaraman

(10) Patent No.: US 10,495,480 B1
(45) Date of Patent: Dec. 3, 2019

(54) AUTOMATED TRAVEL LANE RECOMMENDATION

(71) Applicant: Apple Inc., Cupertino, CA (US)

(72) Inventor: Sayanan V. Sivaraman, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 15/680,010

(22) Filed: Aug. 17, 2017

Related U.S. Application Data

(60) Provisional application No. 62/376,858, filed on Aug. 18, 2016.

(51) Int. Cl.
  *G01C 21/36* (2006.01)
  *G08G 1/01* (2006.01)
  *G08G 1/0967* (2006.01)

(52) U.S. Cl.
  CPC ....... *G01C 21/3691* (2013.01); *G01C 21/365* (2013.01); *G08G 1/0125* (2013.01); *G08G 1/0112* (2013.01); *G08G 1/0141* (2013.01); *G08G 1/096708* (2013.01)

(58) Field of Classification Search
  CPC .............. G01C 21/3691; G01C 21/365; G08G 1/0125; G08G 1/0112; G08G 1/0141; G08G 1/096708
  See application file for complete search history.

(56) References Cited

U.S. PATENT DOCUMENTS

| | | | | |
|---|---|---|---|---|
| 5,696,502 A | * | 12/1997 | Busch | G08G 1/0104 340/905 |
| 6,950,731 B1 | * | 9/2005 | English | G01C 21/20 235/61 B |
| 8,335,641 B2 | * | 12/2012 | Nakayama | G01C 21/3658 340/988 |
| 9,146,127 B2 | * | 9/2015 | Bank | G01C 21/3658 |
| 9,272,711 B1 | * | 3/2016 | Sivaraman | G08G 1/166 |
| 9,672,734 B1 | * | 6/2017 | Ratnasingam | G08G 1/0112 |
| 2002/0198632 A1 | * | 12/2002 | Breed | B60N 2/2863 701/1 |
| 2011/0015805 A1 | * | 1/2011 | Seger | B62D 6/007 701/1 |

(Continued)

*Primary Examiner* — Behrang Badii
*Assistant Examiner* — Daniel L Greene
(74) *Attorney, Agent, or Firm* — Robert C. Kowert; Meyertons, Hood, Kivlin, Kowert & Goetzel, P.C.

(57) ABSTRACT

Various embodiments include an automated travel lane recommendation implemented for a vehicle in response to traffic conditions in the vehicle's vicinity, including characteristics of traffic flow of nearby lanes of travel. In some examples, sensors implemented as part of a vehicle collect data about available lanes and other vehicles and obstructions in the vicinity of the vehicle or along the vehicle's route of travel. According to some examples, sensor fusion logic processes sensor data to calculate metrics associated with traffic conditions relevant to the vehicle. In some embodiments, a preferred travel lane for the vehicle is calculated using a combination of a cost function of traffic metrics with other available information. The preferred travel lane is presented to an operator or control system of the vehicle in some examples. Information, such as preferred lane information, cost function information, and traffic condition metrics is shared with other vehicles and devices, or stored to a database in some examples.

20 Claims, 6 Drawing Sheets

(56) References Cited

U.S. PATENT DOCUMENTS

| | | | | |
|---|---|---|---|---|
| 2013/0282264 A1* | 10/2013 | Bastiaensen | ....... | G01C 21/3492 |
| | | | | 701/119 |
| 2013/0325331 A1* | 12/2013 | Coleman | ............ | G01C 21/3492 |
| | | | | 701/465 |
| 2014/0278052 A1* | 9/2014 | Slavin | ................ | G01C 21/3492 |
| | | | | 701/400 |
| 2017/0008521 A1* | 1/2017 | Braunstein | ............. | G01C 21/32 |

* cited by examiner

AUTOMATED TRAVEL LANE RECOMMENDATION

This application claims benefit of priority to U.S. Provisional Application No. 62/376,858, filed Aug. 18, 2016, titled "Automated Travel Lane Recommendation", which is hereby incorporated by reference in its entirety.

BACKGROUND

Vehicle safety improvements and the rise of interest in automated navigation and control of vehicles have led to the inclusion of different types of remote sensing equipment installed on vehicles. These sensors can include one or more radars, ultrasonic sensors, light beam scanning devices, visible light camera devices, infrared camera devices, near-infrared camera devices, and depth camera devices which can include one or more light-scanning devices, including LIDAR devices, etc. Automated navigation and control systems may process data collected by the sensors in order to detect and characterize objects in the environment for various purposes.

One purpose for detecting and characterizing objects in the environment is to increase efficiency and safety of travel, which can also reduce travel times, decrease fuel usage, reduce environmental pollution associated with vehicular travel, and decrease overall travel costs, among other potential benefits. However, few systems attempt to address traffic flow concerns from the perspective of a particular vehicle.

Current technologies include GPS-based navigation applications that can display real-time traffic conditions to a vehicle operator; analyze traffic conditions, a vehicle destination, and mapping data; and recommend a travel route based on various user-configured or default preferences. Other technologies allow for detection of surrounding vehicles and other traffic obstacles, primarily with the intent to help prevent collisions, as in the case of blind-spot detection and warning devices and similar systems. Some modern cruise control systems, such as a typical "adaptive cruise control" system pursue a target vehicle speed and may adjust speed for safety purposes (e.g. to maintain a safe following distance). However, none of these systems addresses traffic flow at a vehicle level, for example by directing an operator of a vehicle to a lane that is flowing more efficiently than the vehicle's current travel lane.

SUMMARY

Sensors implemented as part of a vehicle may collect data about an environment surrounding a vehicle, such as the locations and velocities of nearby vehicles and other obstructions, the number and location of lanes available to the vehicle, and other road conditions. A sensor fusion module may collect and process data from various sensors. A lane recommendation module may use the sensor fusion data to identify a preferred lane of travel and recommend the preferred lane to an operator of the vehicle. The lane recommendation module or sensor fusion module may additionally consider other data including the vehicle's destination, operator-defined preferences, driving styles, or data of a navigation system including location of highway exits relevant to the vehicle's preferred and alternate routes in relation to the vehicle's position and velocity. The sensor fusion module and lane recommendation module may be implemented completely or partially within the vehicle or remotely from the vehicle. Sensor fusion and lane recommendation data may also be shared with other computing devices or vehicles.

Figure 1:
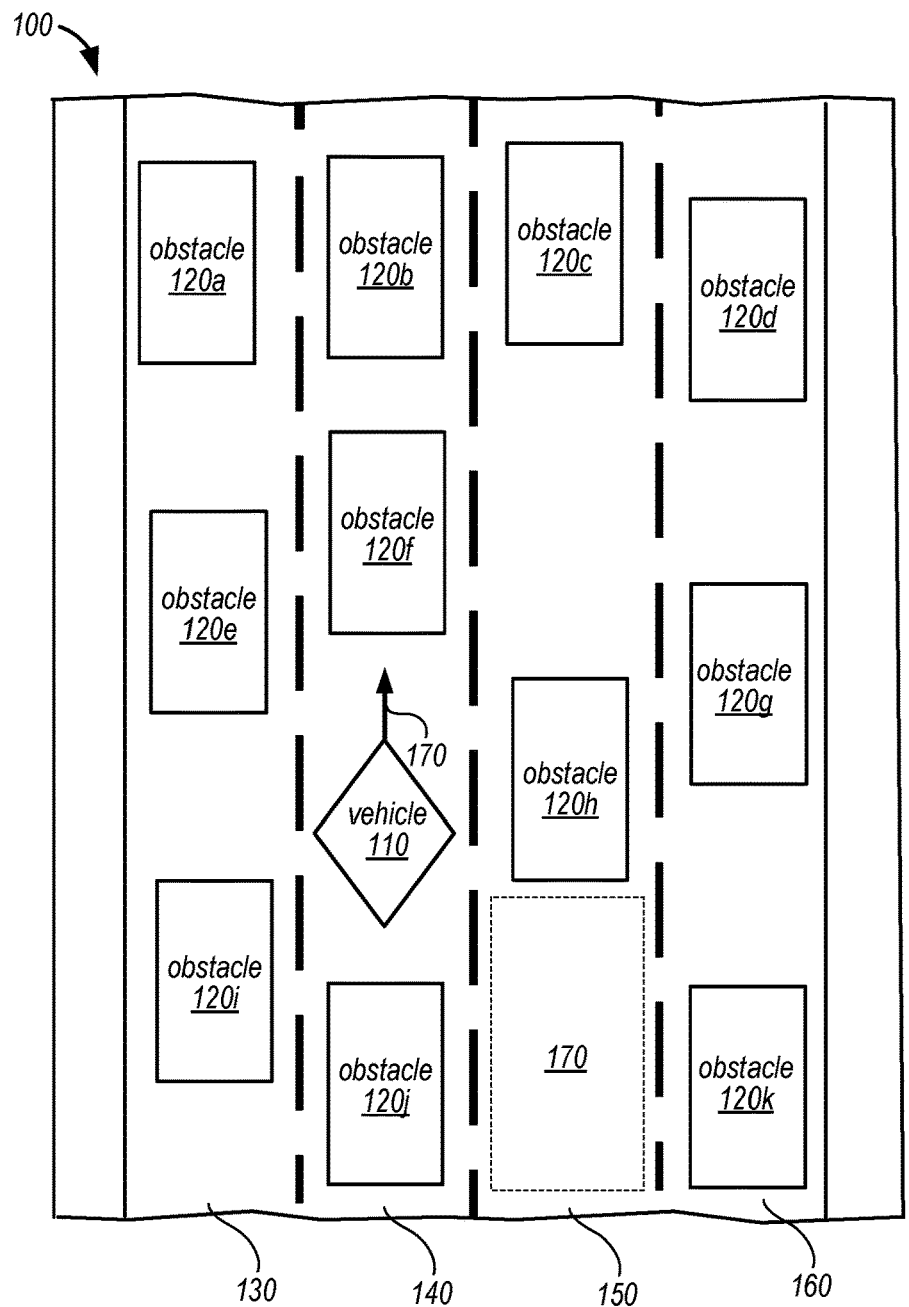
FIG. 1 illustrates an overhead diagram of an environment for implementing automated travel lane recommendation, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values.

The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described here may implement automated travel lane recommendation.

FIG. 1 illustrates an overhead diagram of an environment for implementing automated travel lane recommendation, according to some embodiments. Automated travel lane recommendation may be implemented with regard to vehicle 110 within environment 100. In the illustrated example, vehicle 110 travels in direction 170, as indicated. FIG. 1 shows four traffic lanes (130, 140, 150, and 160) traveling in the same direction. In other embodiments, one or more of traffic lanes 130-160 may travel in a direction different from that of vehicle 110.

According to some embodiments, all or a portion of environment 100 may be within an effective area of one or more sensors (not shown in FIG. 1) coupled to vehicle 110. In some embodiments, the sensors may include one or more radars, ultrasonic sensors, light beam scanning devices, visible light camera devices, infrared camera devices, near-infrared camera devices, and depth camera devices which can include one or more light-scanning devices, including LIDAR devices, etc. These sensors may be physically located within vehicle 110. In some embodiments, some or all of the sensors may be physically located separately from the vehicle, for example on surrounding vehicles or other obstacles, mounted on stationary objects such as light poles or street signs, or embedded within a road surface.

In some embodiments, one or more sensors coupled to vehicle 110 detect one or more of obstacles 120a-120k, which may be surrounding vehicles or other obstacles such as road debris or road surface imperfections located in lanes 130-160, or other locations now shown in FIG. 1. In some embodiments, sensors coupled to vehicle 110 may detect and measure characteristics of travel lanes in the vicinity of vehicle 110. For example, sensors coupled to vehicle 110 may detect one or more of a lateral position, width, curvature, lane marking type and position, or other characteristics of a travel lane. In some embodiments, the sensors may be configured to detect one or all of a position, speed, and size of one or more of obstacles 120a-120k. In some embodiments, some data associated with travel lanes or obstacles may be provided to vehicle 110 from one or more other sources, such as sensors located external of vehicle 110, a navigation system or database, a GPS system, a handheld device, or another vehicle's sensor or automated lane recommendation system.

Data from sensors coupled to vehicle 110 may be used, by itself or in combination with other information, to identify a preferred travel lane for vehicle 110, according to some embodiments and as described in further detail herein. In some embodiments, a preferred travel lane is identified, in whole or part, by calculating a cost function for one or more lanes of travel available to vehicle 110. In some embodiments, the preferred travel lane may be identified as a lane having a low or lowest calculated cost according to the cost function, which is described in further detail herein with reference to FIG. 5.

In some embodiments, cost function calculations are weighted—for example, according to user preference or observed driving style—or combined with additional information to identify the preferred travel lane. For example, an operator or automated control system of a vehicle may access an interface to indicate a preference for lanes with one or more particular characteristics, for example by expressing a preference for one or more of relatively low or high traffic density, average speed, standard deviation of speed, or traffic "bunching."

Figure 2:
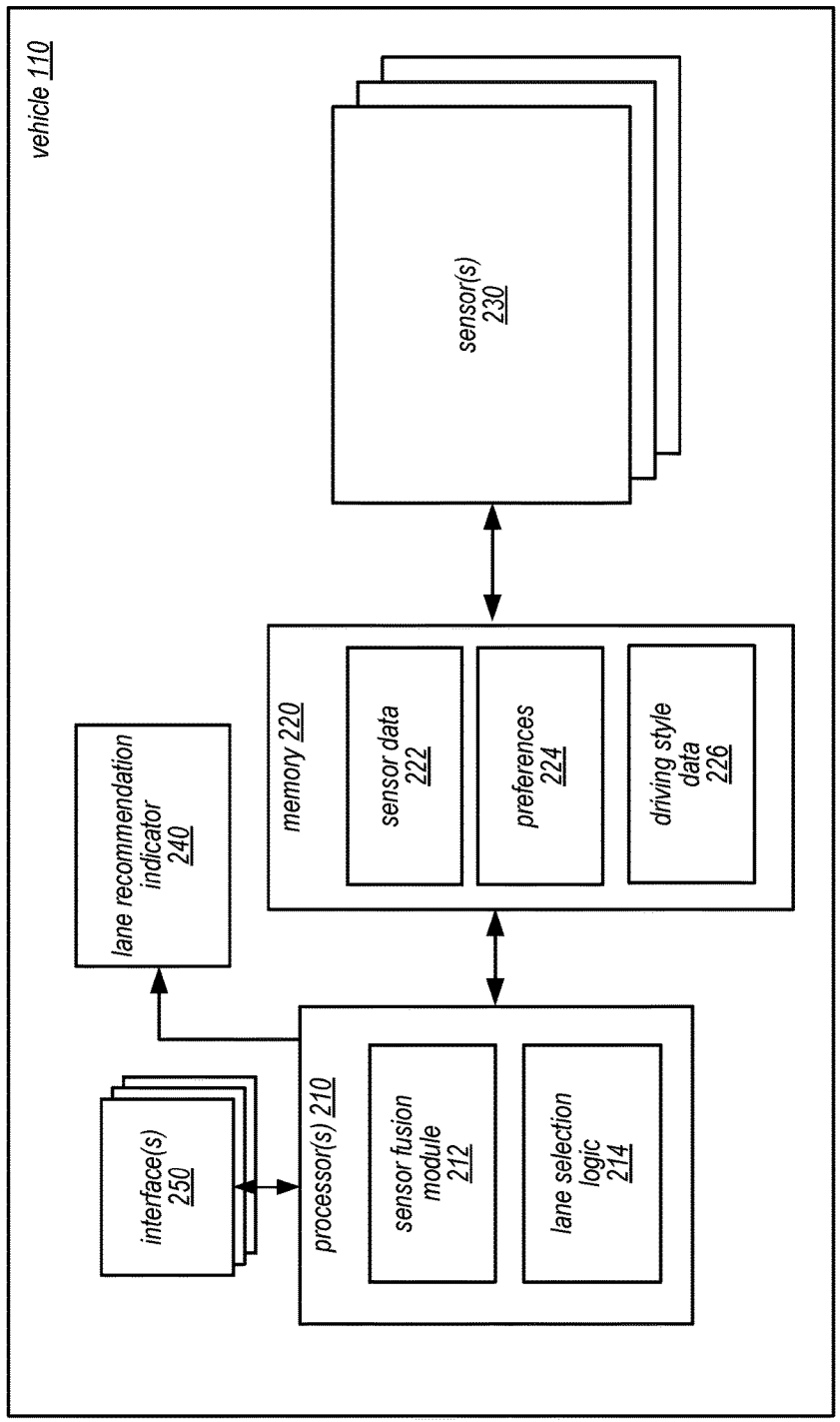
FIG. 2 illustrates a logical block diagram of a vehicle that implements automated travel lane recommendation, according to some embodiments.

FIG. 2 illustrates a logical block diagram of a vehicle that implements automated travel lane recommendation, according to some embodiments. In some embodiments, vehicle 110 may include one or more sensors 230 as described herein. In some embodiments, the sensors may include one or more radars, ultrasonic sensors, light beam scanning devices, visible light camera devices, infrared camera devices, near-infrared camera devices, and depth camera devices which can include one or more light-scanning devices, including LIDAR devices, etc. In some embodiments, sensor 230 collects data and sends the data to a memory 220 of vehicle 110, where some or all of the raw sensor data may be stored as sensor data 222 within memory 220. Memory 220 may also exchange other data with sensors 230 in some embodiments, for example to set or modify operating parameters of one or more sensors 230 or monitor error conditions of sensors 230.

Memory 220 according to some embodiments may also store preferences 224, some of which may be used for weighting certain characteristics when identifying a preferred travel lane, as described herein. For example, a driver or other user of vehicle 110 may enter cost function weighting preferences or other preferences via one or more interfaces 250. For example, a dash console of vehicle 110 or a handheld computing device in communication with vehicle 110 may display a graphical user interface or other means for a driver, user, or administrator of vehicle 110 to enter such preferences. In some embodiments, a driver, user, or administrator of vehicle 110 may wish to specify relative or absolute weighting to one or more of several characteristics, for example traffic density, average speed, standard deviation of speed, and traffic bunching. A measure of traffic bunching according to some embodiments may include a lane's standard deviation of longitudinal position with respect to two or more vehicles.

Memory 220 according to some embodiments may also store driving style data 226. Driving style data may be observed data of a particular operator or automated control system of a vehicle, for example using one or more machine learning algorithms to analyze past driving sessions. In some embodiments, some or all of driving style data 226 may be submitted by an operator, driver, user, or administrator of a vehicle. For example, a driver may enter, via an interface 250, a preference for average speed over longer routes, a tendency toward high acceleration in certain circumstances, or any of numerous other driving-style parameters which will be apparent to one of ordinary skill in the art.

Vehicle 110 may also include a processor 210, according to some embodiments. In some embodiments, processor 210 may be a general computer processor of vehicle 110 with many other functions. In other embodiments, processor 210 may include a processor dedicated to functions related to implemented automated travel lane recommendation.

Processor 210 may implement sensor fusion module 212 for analyzing stored sensor data 222 and/or raw data from sensors 230. In some embodiments, sensor fusion module 212 may receive information about one or more travel lanes in the vicinity of vehicle 110. For example, sensor fusion module 212 may receive measured geometry and metadata, including a lane's lateral position, width, curvature, and lane marking types and location for one or more travel lanes. In some embodiments, all or part of such lane information may be provided directly by sensors, such as one or more visible light cameras. In various embodiments, at least a portion of lane data may be provided by one or more of a database, a navigation system, sensors outside vehicle 110, or other appropriate sources. In some embodiments, information received from sources external of vehicle 110 may be communicated via one or more interfaces 250 configured as a wireless communication interface.

Sensor fusion module 212 may also receive information associated with vehicles and other obstacles located within travel lanes in the vicinity of vehicle 110. For example, sensor fusion module may receive information defining a position, size, and velocity for one or more vehicles or other obstacles. Such information may be specified as two- or three-dimensional data, or another suitable format, according to various embodiments.

In some embodiments, all or part of such obstacle information may be provided directly by sensors, such as one or more of a lidar, radar, or visible light camera, or other suitable sensor as one of ordinary skill would understand. In various embodiments, at least a portion of obstacle data may be provided by one or more of a database, a navigation system, sensors outside vehicle 110, or other appropriate sources. In some embodiments, information received from sources external of vehicle 110 may be communicated via one or more interfaces 250 configured as a wireless communication interface.

According to some embodiments, sensor fusion module 212 may combine travel lane data with vehicle/obstacle data to create an accurate three-dimensional representation of traffic conditions in the vicinity of vehicle 110. This information may be passed to lane selection logic 214. In some embodiments, further processing or lane selection functions may be performed at sensor fusion module 212.

Lane selection logic 214 according to some embodiments may access data created or manipulated by sensor fusion module 212 to identify or calculate a preferred lane of travel from the perspective of vehicle 110. In some embodiments, one or more traffic metrics may be calculated for at least one travel lane in the vicinity of vehicle 110. For example, lane selection logic 214 may calculate, for a travel lane, one or more of a lane's average speed (Vavg), the mean longitudinal velocity of vehicles in the lane; standard deviation of speed (Vstd), the standard deviation of velocities of nearby vehicles in the lane; average density (d), the number of vehicles driving in the lane per unit distance; or a "bunching" characteristic (Pstd), which may represent a standard deviation of longitudinal position of two or more vehicles in the lane. In some embodiments, additional measures or traffic metrics may be calculated and implemented according to various embodiments as will be understood by a person having ordinary skill.

Various relationships of traffic metrics may be preferred when identifying a recommended travel lane, according to some embodiments. For example, in general, it may be preferable to recommend a lane with a relatively higher standard deviation of longitudinal position (Vstd) and relatively higher average speed (Vavg) compared to other nearby lanes. Similarly, according to some embodiments, it may generally be preferable to recommend a lane with a relatively low average density (d) and relatively low standard deviation of speed (Pstd) compared to other nearby lanes.

According to some embodiments, a cost function incorporating one or more traffic metrics may be calculated for one or more travel lanes. In an example embodiment implementing the four traffic metrics described above, one possible cost function may be represented by a cost function J:

$$J_l = \alpha_1 d + \alpha_2 v_{std} + \alpha_3 \left(1 - \frac{v_{avg}}{v_{max}}\right) + \alpha_4 \left(1 - \frac{p_{std}}{p_{max}}\right)$$

$$\hat{l} = \min(J_l)$$

$$\sum_i \alpha_i = 1$$

In this example cost function, the $\alpha$ parameters may be customizable, for example by a user-entered preference or by a machine-learned driving style as described herein. The preferred lane is represented by $\hat{l}$.

Lane selection logic 214 according to some embodiments may use, in combination with or in lieu of a cost function, any of numerous other data which may be provided by other sources, for example by sensors located external of vehicle 110, a navigation system or database, a GPS system, a handheld device, or another vehicle's sensor or automated lane recommendation system.

One of ordinary skill will recognize that separation of responsibilities between sensor fusion module 212 and lane selection logic 214 is presented herein purely for convenience and clarity of description, that elements 212 and 214 are abstractions, and that element 212 or 214 may perform one or several of the functions described herein with reference to the other.

When a lane has been selected for recommendation, the recommendation may be made to a driver or other operator, automated control system, or administrator of vehicle 110. For example, a lane recommendation indicator 240 may display an indication to a driver in one of numerous ways as one of ordinary skill will understand. In some embodiments, a recommended lane indication may be made, for example, on a dashboard display or gauge, a navigation system screen, a head-up display ("HUD"), or by a notification to a handheld device. In some embodiments, auditory instructions indicating a recommendation to change lanes (e.g. "recommend one lane to the right") may be presented within the cabin of vehicle 110. In some embodiments, an indication may be made that the current travel lane is the preferred travel lane, while in other embodiments, and indication may be made only if a lane change would be required to occupy the preferred travel lane. In some embodiments, a preferred lane recommendation may be made only electronically, for example as a signal to an autonomous control or other computing system.

In various embodiments, any or all of the data described herein as being generated or processed at vehicle 110 may be shared with other devices and systems, for example with other nearby vehicles, law or traffic enforcement officials or systems, a navigation system, or a remote database or other storage system.

Figure 3:
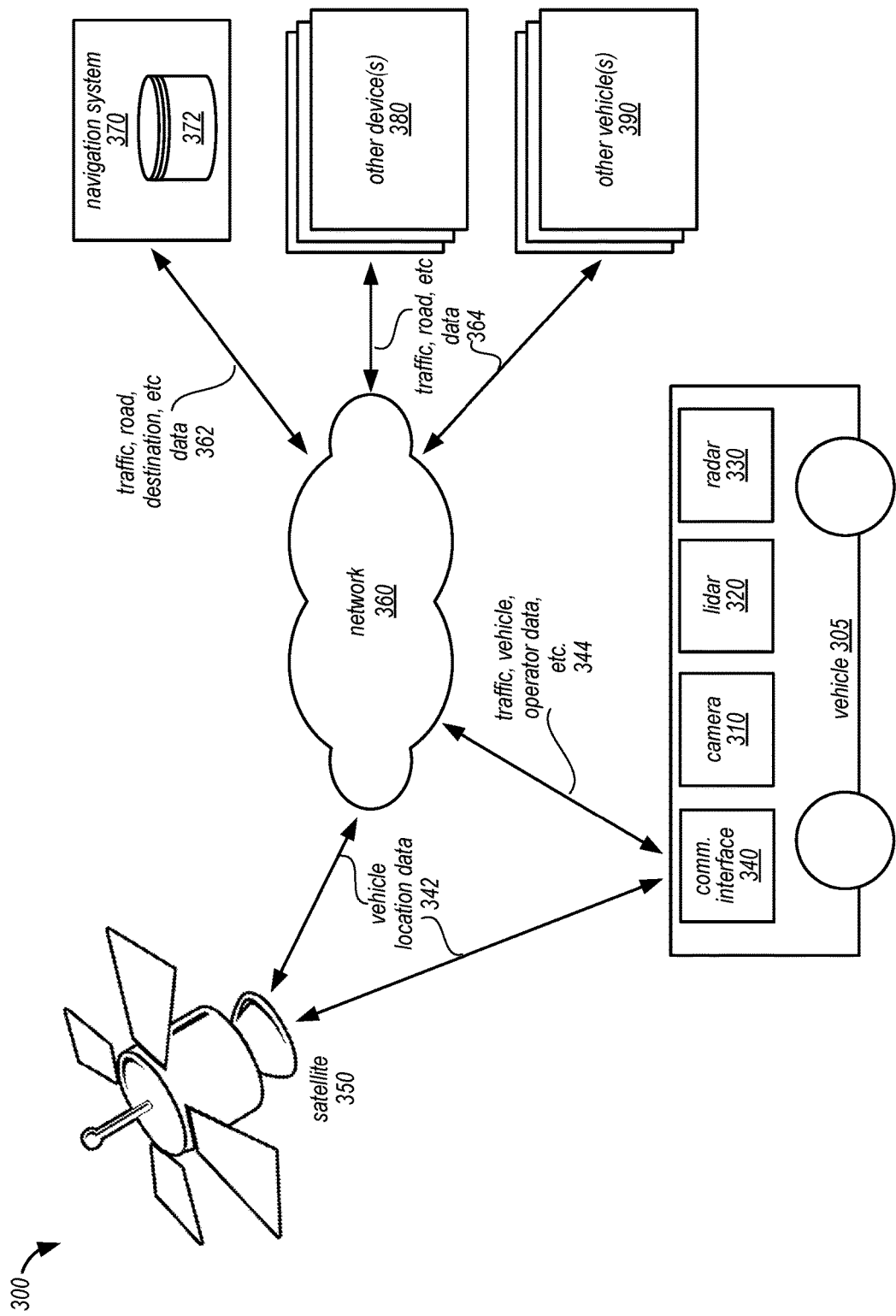
FIG. 3 illustrates a logical block diagram including interactions of a vehicle that implements automated travel lane recommendation, according to some embodiments.

FIG. 3 illustrates a logical block diagram including interactions of a vehicle that implements automated travel lane recommendation, according to some embodiments. Vehicle 305 of example system 300 includes example sensors 310, 320, and 330. Camera 310 according to some embodiments may include a visible light camera used for detecting lane information as described herein.

Lidar 320 of vehicle 305, according to some embodiments, may be used to detect other vehicles and other obstacles in the vicinity of vehicle 305, as described herein. Lidar 320 according to some embodiments may detect a three-dimensional position, three-dimensional size, and three-dimensional velocity of one or more obstacles located in or near one or more travel lanes in the vicinity of vehicle 305.

Radar 330 of vehicle 305, according to some embodiments, may be used, at least in part, to detect or verify velocities of other vehicles or obstacles traveling or stationary in the vicinity of vehicle 305. One of ordinary skill in the art will understand that sensors of vehicle 305, including example camera 310, lidar 320, and radar 330, may overlap in function or may be redundant with specific types of data. Such redundancy according to some embodiments may serve to verify or increase the overall accuracy of sensor data of vehicle 305.

Vehicle 305 may communication, according to some embodiments, via one or more communications interfaces 340. In some embodiments, one or more satellite devices 350, such a device implementing a global positioning system ("GPS"), may communicate to vehicle 305 via communications interface 340. For example, vehicle 305 may receive information about its position via data including vehicle location data 342.

Vehicle 305 may also communicate with network 360, for example to send data 344 including for example traffic metrics, vehicle operator data, lane recommendations, and other data associated with implementing automated travel lane recommendation. Vehicle location data 342 may also be shared with network 360 via satellite 350 or vehicle 305.

A variety of other devices and systems may communicate with network 360 regarding information related to automated travel lane recommendation. For example, other devices 380 and vehicles 390 may send and receive data 364, which may include traffic metrics, lane and road information, or any other data associated with automated travel lane recommendation.

In some embodiments, a navigation system 370 may exchange, with network 360, data 362 related to traffic and road conditions, vehicle destination(s), or other data related to navigation. In some embodiments, data 362 may supplement or replace information stored in a database 372 of navigation system 370. In various embodiments, navigation system 370 may be implemented within vehicle 305 or another vehicle in communication with network 360. In some embodiments, vehicle 305 may communicate directly with any of navigation system 370, other devices 380, or other vehicles 390.

Figure 4:
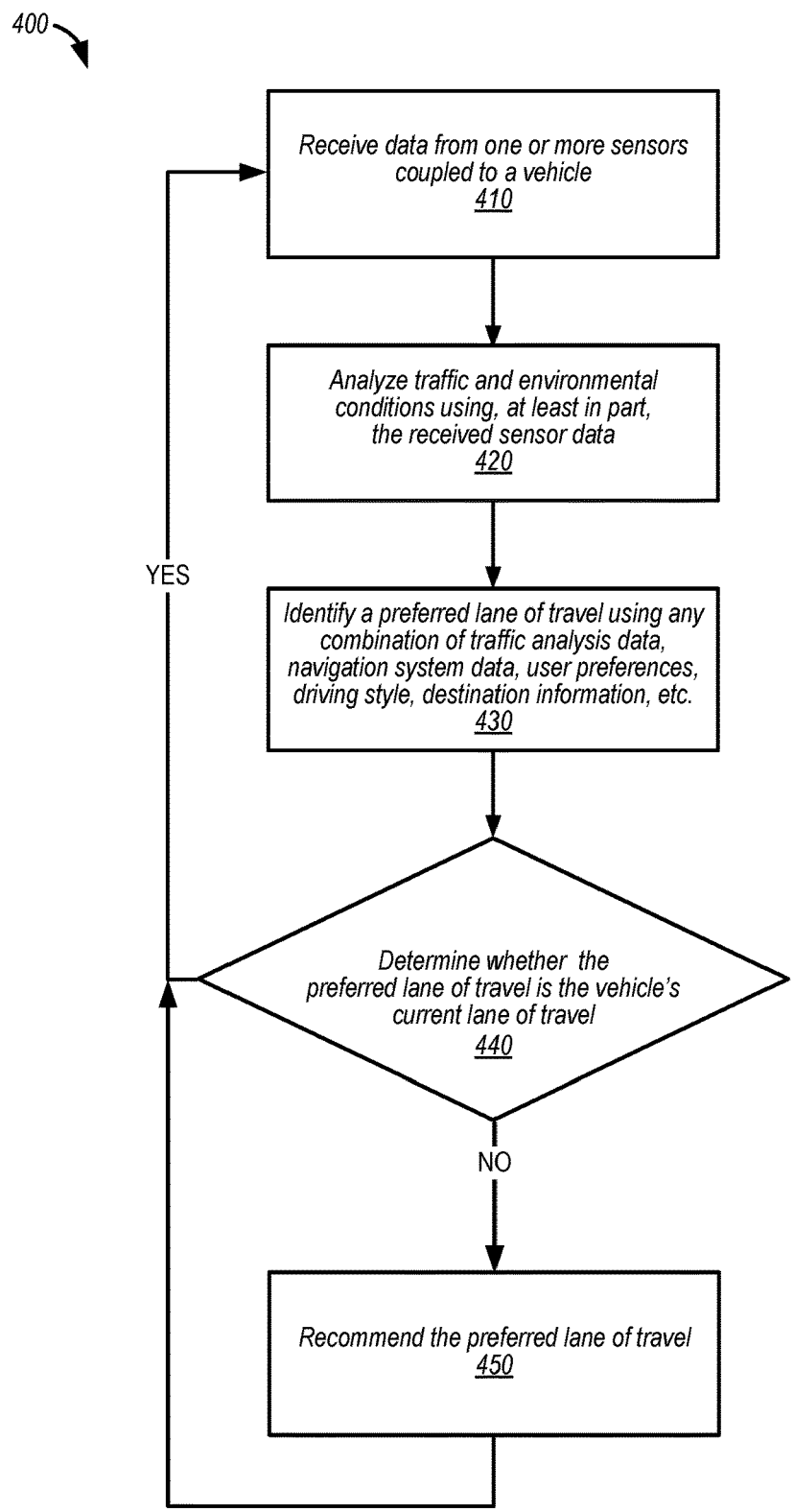
FIG. 4 is a high-level flowchart illustrating various methods and techniques to implement automated travel lane recommendation, according to some embodiments.

FIGS. 1-3 provide examples of a vehicle that may implement automated travel lane recommendation. However, numerous other types or configurations of vehicles or other systems may implement the methods and systems described herein. FIG. 4 is a high-level flowchart illustrating various methods and techniques to implement automated travel lane recommendation, according to some embodiments. The various components described above may implement these techniques (in addition to those described with regard to FIG. 5) as well as various other systems.

FIG. 4 is a high-level flowchart illustrating various methods and techniques to implement automated travel lane recommendation, according to some embodiments. In some embodiments one or more elements of method 400 may be implemented within a processor, for example processor 210 of vehicle 110 as described with reference to FIG. 2. According to various example embodiments, one or more of the steps of method 400 may be implemented remotely from the vehicle for which automated travel lane recommendation is implemented.

At step 410 of method 400, data is received from one or more sensors coupled to the vehicle for which automated travel lane recommendation is implemented. As described herein, sensor data may include information about nearby lanes including physical location, lane geometry and curvature, and lane marking and types. Received sensor data according to some embodiments may also include information about other vehicles and other obstacles in the vicinity of the vehicle for while automated travel lane recommendation is implemented, for example the three-dimensional size, three-dimensional velocity, and three-dimensional location of such vehicles and obstacles.

At step 420, traffic and environmental conditions are analyzed, at least in part using the received sensor data. Step 420 may include performing some or all of the functions described herein with reference to sensor fusion modules 212 of FIG. 2. For example, step 420 may include combining lane data with vehicle/obstacle data to create a comprehensive overview of traffic conditions in the vicinity of the vehicle for which automated travel lane recommendation is implemented.

As discussed herein, in some embodiments, various traffic metrics describing characteristics of nearby vehicles and obstacles may be calculated. Traffic hazards may be noted, especially where the hazard is serious enough that it might necessitate overriding what would otherwise be a recommended preferred travel lane.

At step 430, a preferred travel lane is identified. Step 430 may include performing some or all of the functions described herein with reference to lane selection logic 214 of FIG. 2. For example, step 430 may include calculating a cost function for one or more traffic lanes in the vicinity of a vehicle, where the cost function incorporates traffic metrics calculated at step 420. As describe herein, in some embodiments, some traffic metrics may be weighted according to user preference or machine-learned driving style data.

Step 430 may additionally include considering additional information including a vehicle's destination, nearby required exit, navigation system data, user preferences, or road preferences, among many others, as described elsewhere herein.

At step 440 of method 400, a determination is made whether the identified preferred lane of travel is the current lane of travel for a vehicle for which automated travel lane recommendation is implemented. If the preferred lane of travel is the same as the current lane of travel, no recommendation is needed and the method may proceed back to step 410. In other embodiments, an indication may be provided that the current lane is the preferred lane of travel. Such indication may take any of numerous forms as one of ordinary skill in the art will recognize. For example, an indication may be displayed on a dash, on a HUD, in a navigation system interface, or via a wireless computing device.

If the current lane of travel is not the identified preferred lane of travel, a recommendation may be made at step 450 to a driver or other operator, autonomous control system, or administrator of a vehicle for which automated travel lane recommendation is implemented. In some embodiments, a recommended lane indication may be made, for example, on a dashboard display or gauge, a navigation system screen, a head-up display ("HUD"), or by a notification to a handheld device. Auditory instructions indicating a recommendation to change lanes (e.g. "recommend one lane to the right") may be presented within the cabin of a vehicle, instead of or in addition to other methods of indication. After presenting an indication of the preferred lane of travel, control may pass back to step 410 of method 400.

Figure 5:
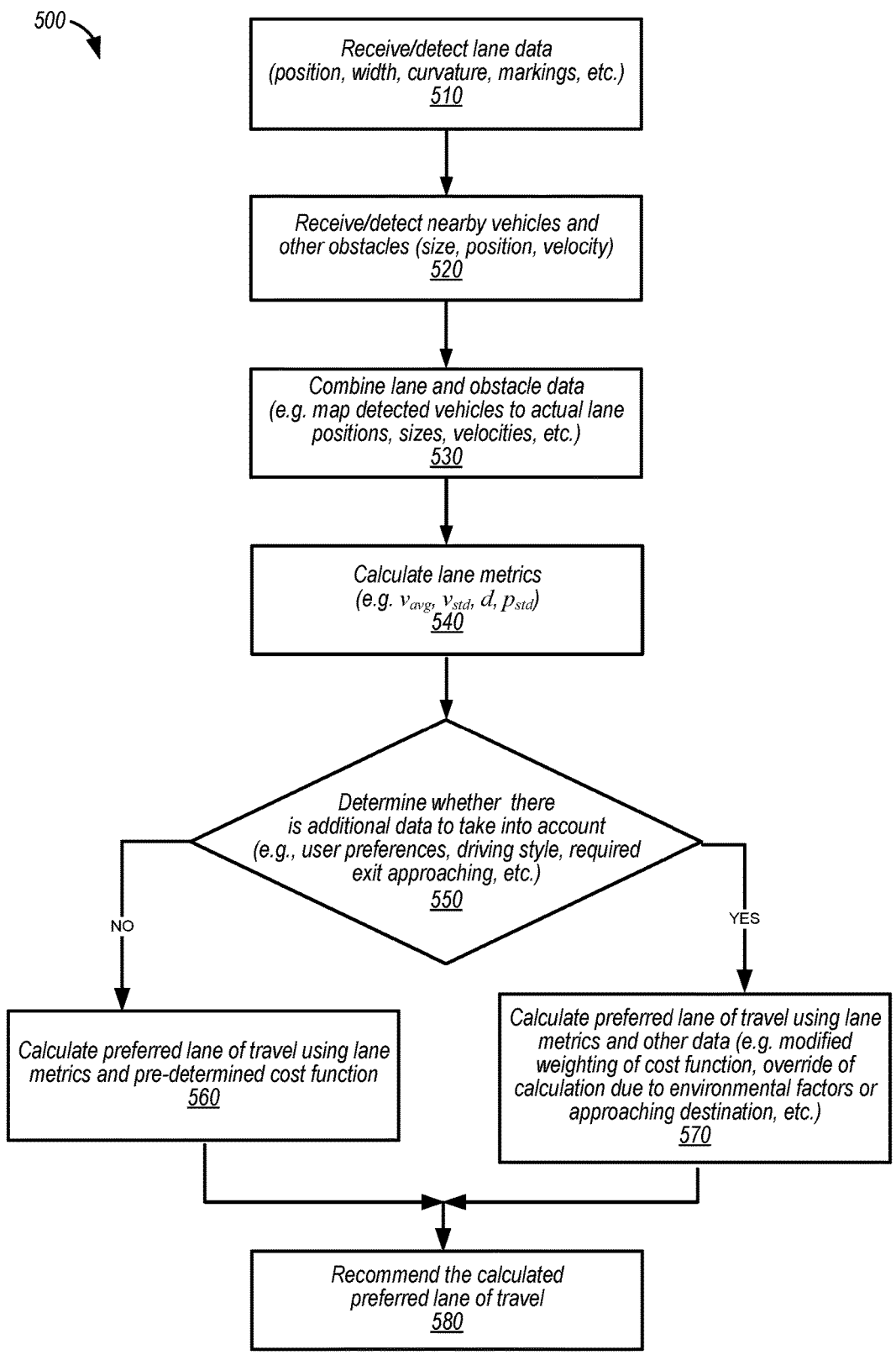
FIG. 5 is a high-level flowchart illustrating various methods and techniques of combining sensor data and identifying a preferred travel lane for implementing automated travel lane recommendation, according to some embodiments.

FIG. 5 is a high-level flowchart illustrating various example methods and techniques of combining sensor data and identifying a preferred travel lane for implementing automated travel lane recommendation, according to some embodiments. In some embodiments one or more elements of method 500 may be implemented within a processor, for example processor 210 of vehicle 110 as described with reference to FIG. 2. According to various example embodiments, one or more of the steps of method 500 may be implemented remotely from the vehicle for which automated travel lane recommendation is implemented.

At step 510 of method 500, data is received or detected to describe one or more travel lanes in the vicinity of the vehicle for which automated travel lane recommendation is implemented. Lane data may include one or more of a lateral position, width, curvature, lane marking type and position, or other characteristics of a travel lane.

At step 520, data is received or detected to describe one or all of a position, speed, and size of one or more of other vehicles or obstacles in the vicinity of the vehicle for which automated travel lane recommendation is implemented.

At step 530 of the example method 500, data received or detected at steps 510 and 520 may be combined to map detected vehicles and obstacles in three dimensions as described herein.

At step 540, one or more traffic metrics may be calculated for at least one travel lane in the vicinity of the vehicle for which automated travel lane recommendation is implemented. For example, calculations made at step 540 may include one or more of a lane's average speed (Vavg), the mean longitudinal velocity of vehicles in the lane; standard deviation of speed (Vstd), the standard deviation of velocities of nearby vehicles in the lane; average density (d), the number of vehicles driving in the lane per unit distance; or a "bunching" characteristic (Pstd), which may represent a standard deviation of longitudinal position of two or more vehicles in the lane. In some embodiments, additional measures or traffic metrics may be calculated and implemented according to various embodiments as will be understood by a person having ordinary skill.

At step 550, a determination is made whether there is additional data to take into account beyond traffic metrics calculated at step 540 in identifying a preferred travel lane. For example, method 500 may additionally consider other data including the vehicle's destination, operator-defined preferences, driving styles, or data of a navigation system including location of highway exits relevant to the vehicle's preferred and alternate routes in relation to the vehicle's position and velocity.

At step 560, if no additional information is to be taken into account, the preferred lane of travel may be calculated using the metrics calculated at step 540 and a pre-defined cost function. For example, a default cost function J for calculating a preferred lane $\hat{l}$ according to some embodiments may be represented by the following equations:

$$J_l = d + v_{std} + \left(1 - \frac{v_{avg}}{v_{max}}\right) + \left(1 - \frac{p_{std}}{p_{max}}\right)$$

$$\hat{l} = \min(J_l)$$

The preferred lane of travel using this equation would be the lane having the lowest calculated J of the lanes for which data is available in the vicinity of the vehicle for which automated travel lane recommendation is implemented.

Where additional data beyond the calculated traffic metrics is to be taken into account in calculating a preferred travel lane, an example weighted cost function may be used according to some embodiments:

$$J_l = \alpha_1 d + \alpha_2 v_{std} + \alpha_3 \left(1 - \frac{v_{avg}}{v_{max}}\right) + \alpha_4 \left(1 - \frac{p_{std}}{p_{max}}\right)$$

$$\hat{l} = \min(J_l)$$

$$\sum_i \alpha_i = 1$$

In this example, the α values are weights of the various traffic metrics, determined for example by user preferences or observed driving styles. Other information may affect the determination of preferred lane in some embodiments, for example information provided by a navigation system including traffic conditions beyond the vicinity of the vehicle for which automated travel lane recommendation is implemented, lane closure information, location of highway exits, preferred routes, etc.

At step 580, the calculated preferred lane of travel may be recommended to a driver or other operator, autonomous control system, or administrator of a vehicle for which automated travel recommendation is implemented. In some embodiments, a recommended lane indication may be made, for example, on a dashboard display or gauge, a navigation system screen, a head-up display ("HUD"), or by a notification to a handheld device. Auditory instructions indicating a recommendation to change lanes (e.g. "recommend one lane to the right") may be presented within the cabin of a vehicle, instead of or in addition to other methods of indication. After presenting an indication of the preferred lane of travel, control may pass back to step 510 of method 500.

As described herein, access may be provided to stored data associated with automated travel lane recommendation. For example, databases for navigational systems may utilize lane information detected by vehicle 110 and other vehicles implementing automated travel lane recommendation. In some embodiments, data from vehicles not in the immediate vicinity of a vehicle implementing automated travel lane recommendation may be used to plan better routes based on expected lane recommendations, lane traffic metrics, etc. Administrators of vehicle fleets may maintain information collected from each fleet vehicle implementing automated travel lane recommendation. One of ordinary skill in the art will appreciate that there are numerous other possible uses in existing and future systems for aggregated data associated with travel lane recommendations, in both real-time applications and in analysis of stored data.

Figure 6:
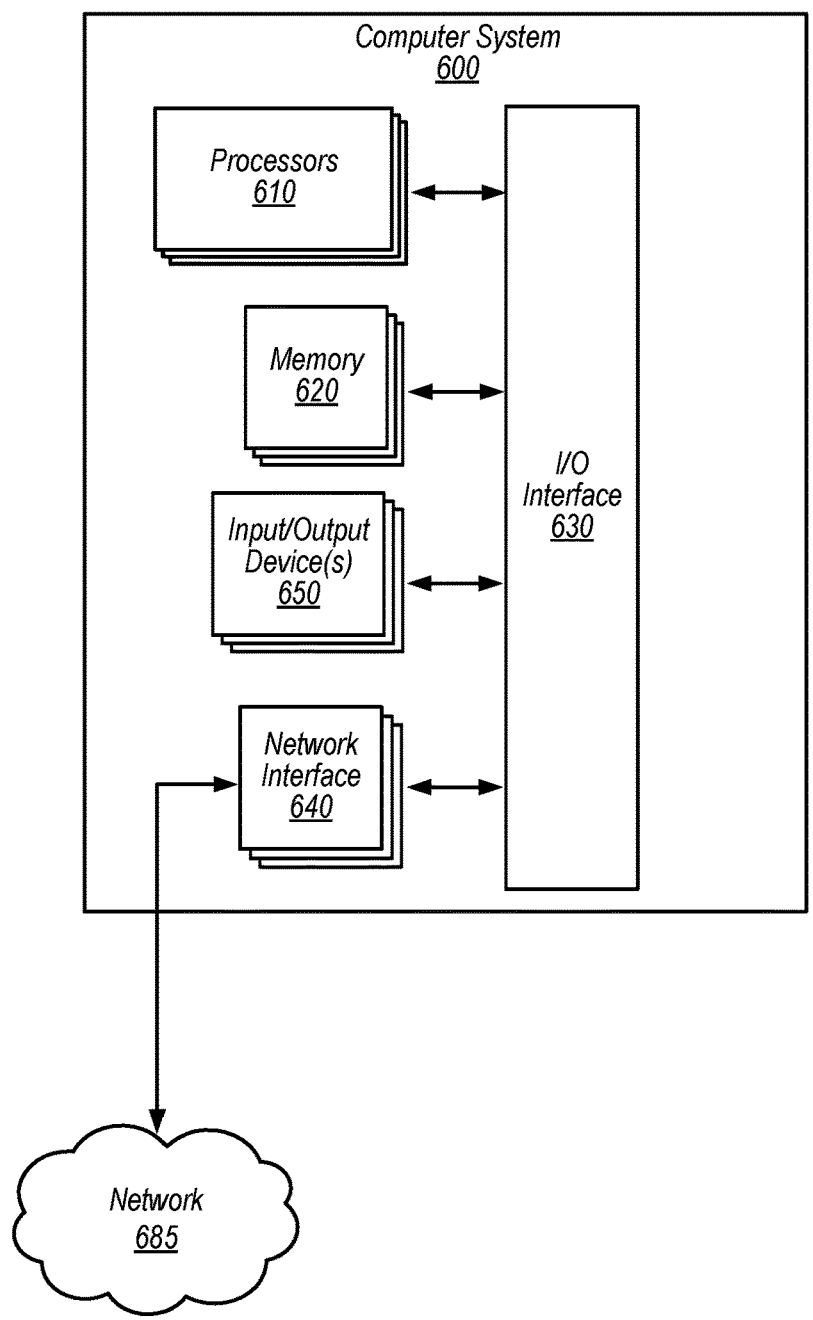
FIG. 6 illustrates a computer system that may be configured to include or execute any or all of the embodiments described herein.

FIG. 6 illustrates an example computer system 600 that may be configured to include or execute any or all of the embodiments described above. In different embodiments, computer system 600 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of automated capture of image data for points of interest may be executed in one or more computer systems 600, which may interact with various other devices. Note that any component, action, or functionality described above with respect to FIGS. 1 through 5 may be implemented on one or more computers configured as computer system 600 of FIG. 6, according to various embodiments. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices, which can include one or more user interface (also referred to as "input interface") devices. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store program instructions, data, etc. accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 620 may be configured to implement some or all of an automated lane recommendation system, incorporating any of the functionality described above. Additionally, existing control data of memory 620 may include any of the information or data structures described above. In some embodiments, program instructions and/or data may be received, sent or stored upon different types of computer-accessible media or on similar media separate from system memory 620 or computer system 600. While computer system 600 is described as implementing the functionality of functional blocks of previous Figures, any of the functionality described herein may be implemented via such a computer system.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network 685 (e.g., carrier or agent devices) or between nodes of computer system 600. Network 685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 600. Multiple input/output devices may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Memory 620 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
a plurality of sensors coupled to a vehicle, the plurality of sensors comprising:
    a first sensor coupled to the vehicle for detecting a plurality of travel lanes in the vicinity of the vehicle; and
    a second sensor coupled to the vehicle for detecting a plurality of obstacles in the vicinity of the vehicle; and
a lane recommendation module configured to:
    receive data from the plurality of sensors;
    analyze traffic conditions, wherein to analyze traffic conditions, the lane recommendation module is configured to:
        calculate, for each of multiple lanes of the plurality of travel lanes, a respective cost according to a cost function that takes into account weighted traffic metrics, wherein a respective value for at least one traffic metric of the weighted traffic metrics is determined using at least a portion of the data received from the plurality of sensors, and wherein a first traffic metric of the weighted traffic metrics has a different weight than a second traffic metric of the weighted traffic metrics;
    identify a preferred travel lane of the plurality of travel lanes, the identification based, at least in part, on the analysis of traffic conditions; and
    recommend the preferred travel lane.

2. The system of claim 1, wherein, to identify the preferred travel lane, the lane recommendation module is configured to consider information provided by a navigation system.

3. The system of claim 1, wherein identifying to identify the preferred travel lane, the lane recommendation module is configured to consider a destination of the vehicle.

4. The system of claim 1, wherein the traffic metrics comprise a flow rate.

5. The system of claim 1, wherein the weighted traffic metrics comprise:
an average speed;
a standard deviation of speed;
an average traffic density; and
a bunching characteristic.

6. The system of claim 1, wherein, to recommend the preferred lane, the lane recommendation module is configured to cause a notification to be provided to an operator of the vehicle.

7. The system of claim 1, wherein the first sensor comprises a camera.

8. The system of claim 7, wherein the second sensor comprises a lidar detection sensor.

9. The system of claim 8, wherein the plurality of sensors further comprises a third sensor for detecting a velocity of at least one of the plurality of obstacles in the vicinity of the vehicle.

10. A method, comprising:
receiving data from a plurality of sensors coupled to a vehicle, the plurality of sensors comprising:
    a first sensor coupled to the vehicle for detecting a plurality of travel lanes in the vicinity of the vehicle; and
    a second sensor coupled to the vehicle for detecting a plurality of obstacles in the vicinity of the vehicle;
calculating, for each of multiple lanes of the plurality of travel lanes, a respective cost according to a cost function that takes into account weighted traffic metrics, wherein a respective value for at least one traffic metric of the weighted traffic metrics is determined using at least a portion of the data received from the plurality of sensors, and wherein a first traffic metric of the weighted traffic metrics has a different weight than a second traffic metric of the weighted traffic metrics;

identifying a preferred travel lane of the plurality of travel lanes, the identifying based, at least in part, on the respective cost; and recommending the preferred travel lane.

11. The method of claim 10, wherein the weighted traffic metrics are weighted based at least in part on one or more of:
user preferences; or
data associated with at least one driving habit of an operator of the vehicle.

12. The method of claim 10, further comprising receiving preferences of a user, wherein the identifying the preferred travel lane is based, at least in part, on the preferences of the user.

13. The method of claim 10, further comprising receiving data associated with at least one driving habit of an operator of the vehicle, wherein the identifying the preferred travel lane is based, at least in part, on at least a portion of the data associated with the at least one driving habit of the operator of the vehicle.

14. The method of claim 10, wherein recommending the preferred travel lane comprises presenting an indication of the preferred travel lane within a head-up display of the vehicle.

15. The method of claim 10, wherein recommending the preferred travel lane comprises identifying the preferred travel lane to an autonomous control system of the vehicle.

16. The method of claim 10, wherein the weighted traffic metrics comprise:
an average speed;
a standard deviation of speed;
an average traffic density; and
a bunching characteristic.

17. The method of claim 16, wherein identifying a preferred travel lane comprises identifying the preferred travel lane as having a lowest cost among the multiple lanes according to the cost function.

18. A non-transitory, computer-readable storage medium storing program instructions that when executed by one or more computing devices cause the one or more computing devices to implement:
receiving data from a plurality of sensors coupled to a vehicle, the plurality of sensors comprising:
a first sensor coupled to the vehicle for detecting a plurality of travel lanes in the vicinity of the vehicle, the first sensor comprising a visible light camera;
a second sensor coupled to the vehicle for detecting a plurality of obstacles in the vicinity of the vehicle, the second sensor comprising a lidar detection sensor; and
a third sensor coupled to the vehicle for detecting a velocity of at least one of the plurality of obstacles in the vicinity of the vehicle, the third sensor comprising a radar sensor component;
calculating, for each of multiple lanes of the plurality of travel lanes, a respective cost according to a cost function that takes into account weighted traffic metrics, wherein a respective value for at least one traffic metric of the weighted traffic metrics is determined using at least a portion of the data received from the plurality of sensors, and wherein a first traffic metric of the weighted traffic metrics has a different weight than a second traffic metric of the weighted traffic metrics;
identifying a preferred travel lane of the plurality of travel lanes, the identifying based, at least in part, on the respective cost; and
recommending the preferred travel lane.

19. The non-transitory, computer-readable storage medium of claim 18, wherein the weighted traffic metrics comprise:
an average speed;
a standard deviation of speed;
an average traffic density; and
a bunching characteristic.

20. The non-transitory, computer-readable storage medium of claim 19, wherein the weighted traffic metrics are weighted based, in part, on at least one of:
preferences received from a user; or
data associated with at least one driving habit of an operator of the vehicle.

* * * * *